Nov. 10, 1970  V. PRETORIUS ET AL  3,539,494

CHROMATOGRAPHIC SEPARATION

Filed Aug. 2, 1967  2 Sheets-Sheet 1

INVENTORS
VICTOR PRETORIUS
HANS HELMUT HAHN
BY J. William Miller

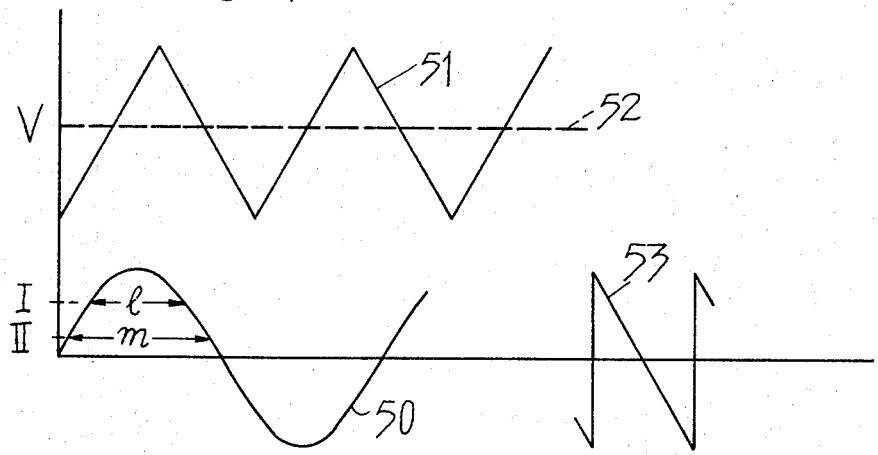
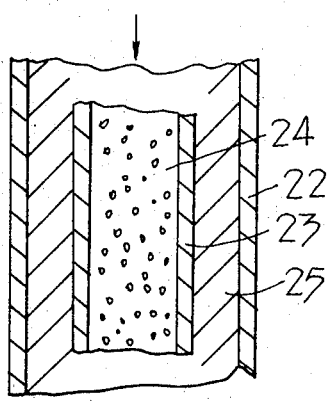
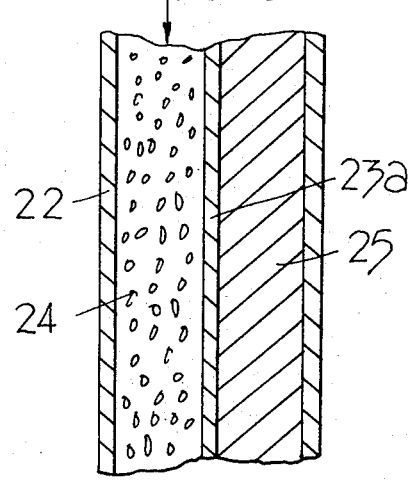
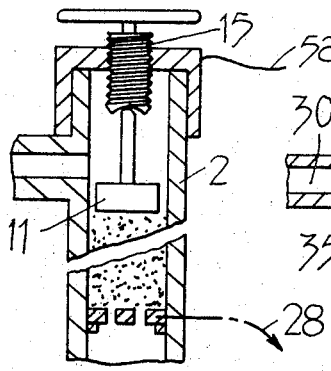
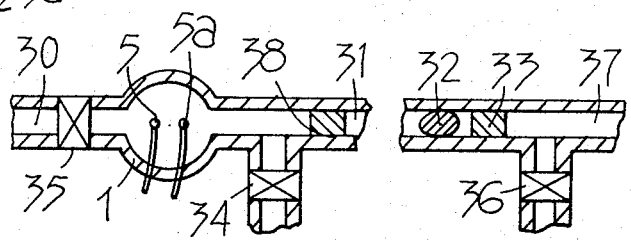

[Patent No.] 3,539,494
Patented Nov. 10, 1970

3,539,494
CHROMATOGRAPHIC SEPARATION
Victor Pretorius, Klein Waterkloof, Club Ave., Waterkloof, Pretoria, Republic of South Africa, and Hans Helmut Hahn, 38 Morais St., Bailey's Muckleneuk, Pretoria, Republic of South Africa
Continuation-in-part of application Ser. No. 583,788, Oct. 3, 1966. This application Aug. 2, 1967, Ser. No. 657,815
Claims priority, application Republic of South Africa, Aug. 2, 1966, 66/4,568
Int. Cl. B01k 5/00
U.S. Cl. 204—299                                 6 Claims

ABSTRACT OF THE DISCLOSURE

Retention of solutes on the retarding phase is induced by applying to the entire retarding phase an electrical potential, either uniformly or with a gradient. The potential may be AC alone or DC combined with AC. In the latter case additional separation effects are attainable. The AC pulse shape, frequency and amplitude is adjusted with a pulse generator.

CROSS REFERENCES TO RELATED APPLICATIONS

This is a continuation-in-part of Ser. No. 583,788 filed Oct. 3, 1966 and Ser. No. 598,365 filed Dec. 1, 1966, which by reference thereto are to be considered as part of this disclosure.

Also pertinent is the disclosure of the following applications being filed at approximately the same time as the present application "Improvements Relating to Detection in Chromatography" and "Method and Apparatus for the Introduction of Samples Into Chromatographic Separating Systems."

BACKGROUND OF THE INVENTION

The present invention relates to a chromatographic separating process and apparatus.

In chromatography a plurality of substances are separated from one another by virtue of differences in their distribution between a retarding phase and a forwarding phase. The invention is applicable to chromatography with a liquid forwarding phase.

In accordance with the prior art the retarding phase can for example be a liquid (partition chromatography) in which case the relative solubilities of the substances in the two liquid phases are relied upon for the separation, an adsorbent or an ion exchanger. There exists a continuous need for new separating systems in chromatography to solve particular separation problems in the most effective manner.

It is an object of the present invention to provide a chromatographic separating system in which retention in the retarding phase is induced in a totally different manner from the above, thereby to make available to those skilled in the art a range of new possibilities to effect chromatographic separations. It is a further object of the invention to provide a chromatographic system of which the separating characteristics are particularly easily adjustable. Other objects and advantages will become apparent in their proper context from the following more detailed description of the invention.

SUMMARY OF THE INVENTION

In accordance with the present invention a chromatographic separating process comprises the feature that a potential is applied to the retarding phase in order to include retention in respect of solutes amenable to a reversable electrodeposition and that said solutes are separated by virtue of their potential dependant distribution coefficients as defined by the relationship:

$$\log \frac{a_{\text{solution}}}{a_{\text{solid}}} = \frac{n(E-E_0)}{0.0591}$$

wherein $E$ is the applied potential, $E_0$ is the standard electrode potential of the solute, $n$ is its ionic charge, $a_{\text{solution}}$ is its activity in the solution and $a_{\text{solid}}$ is the activity of the electrodeposit thereof.

The process may be carried out under a very large variety of conditions, depending on the particular separating problem and, very largely, at the option of the skilled operator who, in accordance with the preferred embodiment may be able to change these conditions by the mere operation of simple electrical control means.

The process may be carried out with a direct current potential applied to the retarding phase or with an alternating current potential (resulting in different benefiical effects) or a combination of the two.

According to some embodiments a substantially uniform potential is applied to the entire retarding phase whilst in other embodiments a voltage gradient is applied in the direction of the flow of the forwarding phase.

On the basis of available known data it is possible to adjust the potential to any desired optimum level, preferably a level at which the distribution constants for the components of the sample between the retarding phase and a forwarding phase are between 0.8 and 5. It is also possible to program the potential applied to the retarding phase as a function of the progress of the chromatogram, either continuously or in stages, both in respect of the overall potential applied as well as in appropriate cases in respect of the form of the potential gradient. The potential programming is thus analogous to temperature or pressure programming in conventional chromatography. It can also replace the changing of eluent composition resorted to in conventional chromatography.

Where alternating current potentials are applied a pulse shape is selected having a diminishing width at increasing potential levels, e.g. a sine wave or sawtooth-shape as distinguished from so-called square waves. When a pulse generator is used, the pulse shape may be adapted to any particular requirements. For example, it may be found beneficial for the pulse to rise steeply to a maximum potential and to fall more gradually.

These variations may all be at the disposal of the operator at his option.

A chromatographic apparatus quite generally is adapted to contain a retarding phase and a forwarding phase, the one flowing relative to the other. In accordance with the invention such apparatus comprises the feature of a conductive retarding phase and electrical connections for applying an electrical potential to substantially the entire retarding phase and means for regulating said potential.

According to one embodiment, suitable particularly for the entire retarding phase to be maintained at a substantially uniform potential the retarding phase is adjoined by a reference electrode substantially along its entire length in the direction of flow of the forwarding phase prescribed by the apparatus.

The apparatus may also comprise a pair of terminals at opposite ends of the retarding phase for applying a potential gradient in the direction of flow between the retarding phase and forwarding phase prescribed by the apparatus. The two possibilities may also be combined interchangeably in a single apparatus. Various other variations and modifications of the invention will become apparent from the following more detailed description of preferred embodiments.

BRIEF DESCRIPTION OF THE DRAWINGS

In the following the invention will be further explained by way of example with reference to the accompanying drawings in which:

FIG. 4 illustrates examples of pulse shapes of alternating current potentials to be used in some embodiments of the process;

FIGS. 5 and 6 represent broken away sections of two constructions suitable both as an eluent cleaning device and as a separating column for a chromatographic apparatus in accordance with the invention;

FIG. 7 represents a modification of a chromatographic apparatus in accordance with the invention in which the resistance of the retarding phase is variable; and FIG. 8 represents a diagrammatic plan view of a high pressure inlet system for a high speed capillary chromatographic separating system in accordance with the invention.

DESCRIPTION OF THE PREFERRED EMBODIMENTS

Figure 1:
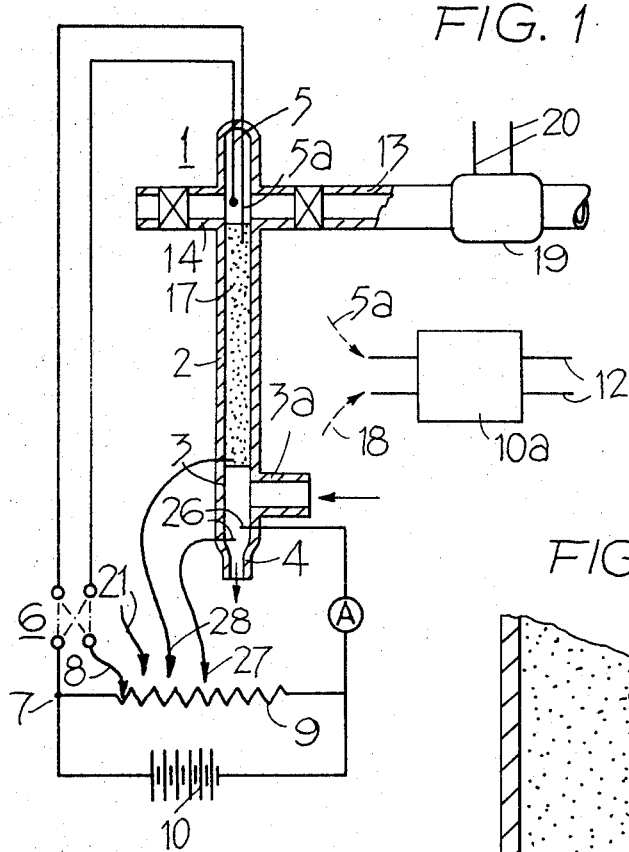
FIG. 1 represents a diagrammatic vertical elevation of a simple embodiment of a chromatographic apparatus in accordance with the inevention.

Referring in FIG. 1 the inlet system of the chromatographic aparatus is generally indicated as 1. It is followed in downward direction by a chromatographic column 2, a detector cell 3 and an outlet 4. The inlet system, which forms the subject of a separate application comprises an electrode 5 and a wire 5a connected to the conductive packing of column 2 serving as reference electrode. Electrode 5 and wire 5a are respectively connected through a current reversal switch 6 to the fixed terminal 7 and the sliding contact 8 of a potentiometer 9 connected across the terminals of a battery 10.

A sample solution is circulated by means not shown via inlet pipe 13 and outlet pipe 14 through the inlet system 1 where a predetermined potential is maintained between electrode 5 and the column packing to plate the sample on to one electrode. After this has been achieved to the desired extent the sample circulation is stopped. Pipe 13 now becomes the inlet for the eluent. The potential between electrode 5 and the packing is now reversed in a predetermined manner, either so as to return the entire sample rapidly into solution or to do so in stages to achieve a preliminary separation before the chromatographic separation proper. Due to the potential now applied to the column packing the solutes of the sample are immediately redeposited at the top end of the column. The chromatographic separation takes place on column 2 by elution with the eluent, i.e. the forwarding phase, which is first freed of oxygen in a manner known per se and then, on its way to the column, passes through an electropurifier 19 across the electrode terminals 20 of which a predetermined potential is applied (tapped off from the potentiometer 9 by the contact 21) to remove all impurities which might interfere with the chromatogram or the readings taken by detector 3.

In this particular example the column packing has an appreciable resistance. Its bottom end is electrically connected to the movable contact 28 of potentiometer 9 for the purpose of applying a potential gradient to the column packing providing the retarding phase of the system. For the packing it is possible to employ metal powders or carbon powders, in particular graphite powders, one particularly preferred example being so-called glassy carbon. Powders of synthetic or natural resins or elastomers may be employed containing a conductive filler, e.g. metal or graphite, the amount of filler and its manner of spacial arrangement and distribution in the resin or elastomer being variables allowing the resistance of the column to be varied as desired. Another variable available for the same purpose is the density of packing of the powder and the force with which the particles are pressed together. This, in accordance with the modification shown in FIG. 7 may be varied with a porous sintered metal piston 11 actuated by an adjustment screw 15.

According to a particular feature, applicable primarily to microanalysis, the electrochromatography is carried out on columns of powders composed of particles between 10 and 0.01 micron in diameter, preferably predominantly, more particularly wholly of submicron size and accordingly the pore dimensions are substantially of the same order of magnitude. The liquid is then forced through the column at high speed with a pressure fall over the column of at least 50 and preferably at least 100 atmospheres, more particularly between 200 and 500 atmospheres, say approximately 350 atmospheres as will be described further below.

The preferred column takes the form of a capillary between 0.5 and 3 mm. say between 0.7 and 1.5 mm. internal diameter and between 0.5 and 20 cm., preferably between 1 and 4 cm., say 1.5 cm. long, packed as aforesaid.

The preferred method is carried out with the aforesaid column at operating speeds of between 1 and 20 mm./sec., say 5 mm./sec. but higher velocities are not necessarily detrimental.

According to a further embodiment of the invention the column, regardless of its dimensions may be filled with a conductive foam, which, in the case of micro columns of dimensions as just referred to would have correspondingly minute open cells, e.g. of the same order of magnitude as the just described powder particles.

Particularly fine foams may be prepared by emulsification of an aqueous resin such as ureaformaldehyde, containing very fine graphite or metal powder as a conductive filler, with a substantially water-insoluble liquid, e.g. a hydrocarbon solvent. The emulsion may be introduced directly into a tube and caused to set by acidification. The ratio of resin to solvent will determine the density of the eventual foam. A suitable ratio is, for example, 1 volume of aqueous resin of 40% solids content to 8 volumes of solvent. Suitable emulsifying agents are known per se and are commercially available, an example being dodecyl benzene sodium sulphonate.

Columns of larger dimensions may be packed with correspondingly coarser foams. Such foams could conceivably be made of inherently conductive material, e.g. in the form of a foam plastic containing a conductive filler. Alternatively the foam may be coated throughout with a conductive layer, e.g. of silver deposited by the known reduction method. In connection with suitable foams and similar chromatograchic packings the disclosure of our pending application Ser. No. 598,365, filed Dec. 1, 1966 is referred to.

Referring again to FIG. 1, elution with the forwarding phase purified at 19 causes the components to wander through the column 2 at different rates, and their arrival at the outlet end of the column is detected by the detector 3, which forms the subject of our application Ser. No. 583,788, filed Oct. 3, 1966. The detector comprises a pair of electrodes 26 across which a potential is applied tapped off from potentiometer 9 by means of the slidable contact 27. Any change in composition of the eluate passing through the detector becomes apparent by a change in the current measured by the amperemeter or equivalent current measuring device A. If necessary inlet 3a may be employed to introduce a supporting electrolyte.

Figure 2:
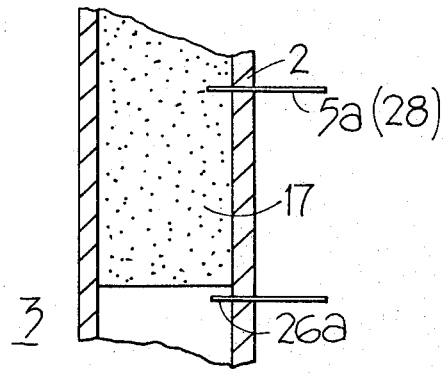
FIG. 2 represents the outlet end of an embodiment of an apparatus in accordance with the invention.

A preferred detector arrangement is shown in FIG. 2 which is suitable for columns 2 of which the conductive packing 17 by means of the connection(s) 5a (28) may be either maintained with a potential gradient or a uniform potential. Here the packing 17 serves as one of the electrodes of the detector 3 followed after as small as possible a gap by the detector electrode 26a.

Figure 3:
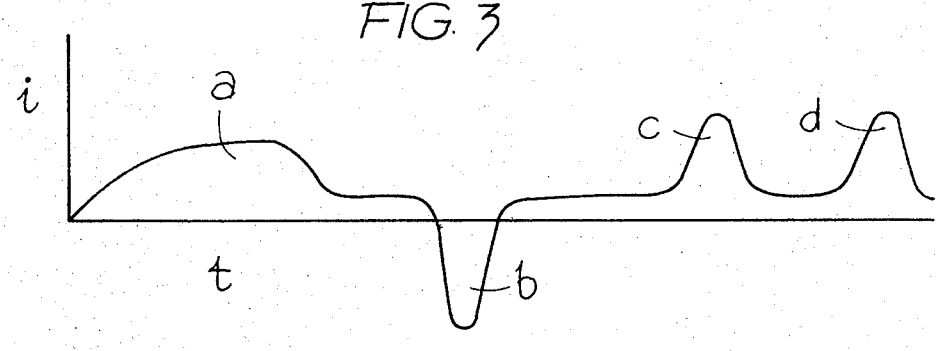
FIG. 3 illustrates the type of chromatogram which is to be recorded by the process in accordance with the invention.

Referring now to FIG. 3, a typical chromatogram is shown, recorded automatically in terms of current ($i$) versus time ($t$). First of all the current is measured between electrode 5 and connection 5a of the inlet system whilst the sample is collected on the electrode (peak $a$). Peak $b$ is recorded across the same connections during the reversal of the current when the sample is transferred from the electrode 5 to the packing 17. The remainder of the graph is recorded off the detector and shows two peaks $c$ and $d$ successively being eluted off the packing. The fact that peaks $c$ and $d$ together equal the peak area of peak $b$ indicates that no other components are retained on the packing.

The apparatus in accordance with FIG. 1 provides also for the application of alternating current potentials to the packing 17 (and, if so desired, to the detector electrodes 26. For that purpose a pulse generator 10a with input terminals 12 forms part of the apparatus. Its output terminals are connected to the wire 5a of the packing 17 and a reference electrode 18.

As shown in FIG. 4, one pulse form 50 is that of an ordinary sine wave. With alternating current separation is further induced by an additional effect not afforded by direct current potentials. In the graph the deposition potentials of two solutes are indicated as I and II respectively. Because of the pulse shape the time $m$ during which a potential higher than the deposition potential II prevails is longer than the period 1 during which the potential exceeds the deposition potential I of the other substance. The separation factor due to this diffference will therefore be $m/1$ which may be subject to minor corrections due to subsidiary effects.

The pulse shape and amplitude may be modified to optimalise the separation. The sawtooth shape 51 is suitable where the deposition potentials of several components of a sample are fairly evenly spread. Curve 51 further illustrates that the alternating current potential may be superimposed upon a direct current potential 52, for example, if it is desired to retain one or more components completely until certain other components have been eluted.

53 illustrates an asymmetrical pulse shape corresponding to a steep potential rise and a more gradual potential fall, as may be found suitable in certain cases.

It is possible in principle to observe oscilloscopically the polarographic phenomena taking place on the retarding phase, both during the rise and the fall of the potential pulses.

The invention furthermore allows changing the pulse-characteristics during appropriate stages of the progress of a chromatogram.

For removing undesirable contaminants from the eluent before its entry into the separating system the purifier 19 (FIG. 1) is used.

One embodiment of the purifier is illustrated in FIG. 5 comprising a tubular outside wall 22, in concentrical relationship thereto a porous sinterglass tube 23 containing an electrically conductive liquid-pervious packing 24, e.g. tin shot, glassy carbon powder, silver plated plastic foam, in electrical contact with one of the terminals 20 in FIG. 1 and a reference electrode, the electrode material, e.g. calomel or silver chuoride filling space 25. The reference electrode is connected to the other terminal 20. The porous tube 23 is impregnated with agar, saturated with an electrolyte compatible with the reference electrode.

The embodiment in accordance with FIG. 6 differs from that in accordance with FIG. 5 by the substitution for porous tube 23 by a porous partition 23a, similarly impregnated with electrolyte saturated agar, and dividing the tube 22 into two parallel passages, one containing the reference electrode, the other the conductive packing 24. A suitable partition may be made out of the porous plates (e.g. sintered synthetic resin) employed in accumulators as electrode spacers.

The constructions in accordance with FIGS. 5 and 6 may, however, also be employed as actual electrochromatographic columns in which case the various preferred features of the column packing described further above may be applied mutatis mutandi to the conductive packing 24. If difficulties are experienced with contamination entering the packing from the reference electrode this may be mitigated by a semi-pervious ion exchanger membrane or by the impregnation of member 23 or 23a with an ion exchanger.

FIG. 8 illustrates a preferred means for the pressurisation of a micro-analytical chromatographic apparatus in accordance with the invention. The inlet system 1 has a valve-controlled eluent inlet 30 through which a volume of eluent is introduced under low pressure into storage tube 31, a limit being imposed by the stage at which a plug 32 of mercury reaches the sinterglass barrier 33. If it is desired to flush the system, use may be made of the valve-controlled outlet 34. During elution the valves 34, 35 and 36 are closed and nipple 37 is subjected to the full pressure of a gas bomb. This causes displacement of the eluent out of tube 31 into and through the column, followed by the mercury plug 32. Elution cannot proceed beyond the point at which the mercury comes up against the sinterglass barrier 38 which serves as a safety device to prevent entrance of the mercury into the column.

Valve 36 serves for pressure relief when required, e.g. during the introduction of a volume of eluent into the tube 31.

An indication of the separation effects attainable and the separation conditions required is available from existing tables of electrochemical data, although accurate calculations are extremely complicated. At this stage the easiest will be to determine optimum conditions by simple experiment as is still done in many other fields of chromatography, pending the availability of more complete tabulated data. The following examples are to be considered as purely for purposes of illustration:

EXAMPLE 1

Separation of $Sn^{++}$ from $Pb^{++}$ (a) Direct current: Eluent dilute $HNO_3$; applied potential $-1.81$ v.; separation factor approximately 3. The lead band moves at approximately ⅔ the rate of the eluent.

(b) Alternating current: Sawtooth pulses, amplitude $\pm 2.1$ volt, both bands in equal concentrations of $10^{-4}$ M when fully dissolved. Separation factor 1.1, band velocity for tin approximately 93% of eluent velocity, for lead approximately 92%.

EXAMPLE 2

Separation of $Ni^{++}$ from $Co^{++}$ (a) Direct current: Eluent dilute $NHO_3$, applied potential $-197$ v.; separation factor 4.2, the cobalt band moves at approximately ⅔ the rate of the eluent.

(b) Alternating current: Sawtooth pulses, amplitude $\pm 2.15$ volt, both bands when fully dissolved in equal concentrations of $10^{-3}$ M, separation factor 1.7, band velocities 96% and 93% of eluent velocity respectively.

EXAMPLE 3

Separation of $Cu^{++}$ from $Bi^{+++}$

A solution in 0.1 N HCl, $10^{-9}$ M in respect of $Bi^{III}$ and $Cu^{II}$ is prepared. 100 ml. of this solution is circulated in contact with a pinhead sized platinum electrode, serving as the cathode and a calomel electrode of large surface area as reference. The voltage is adjusted to result in a current of approximately $10^{-8}$ A. which is maintained for 30 minutes.

The current is then reversed to return the sample collected on the Pt. electrode into solution in a matter of approximately 1/10 second, whilst an attempt is made to record the polarogram oscilloscopically. As is to be expected the polarogram shows only a single step at a voltage corresponding to that of a standard calomel electrode, since the oxidation potentials of Bi and Cu in 0.1 N HCl are very similar (+0.09 v. and −0.04 v. respectively measured against calomel, 0.1 N KCl).

The sample is fed into a micro-electrochromatographic capillary column packed with extremely fine glassy carbon. The column length is 20 cm., flow rate 1 mm./sec. A direct current voltage of +0.62 volt relative to calomel is applied to the packing in order to achieve complete separation. It is estimated that it may be possible to shorten the column for this particular separation to as little as 2 cm. Copper emerges first with a peak having a concentration of approximately 0.01 M. at its highest point, whilst bismuth emerges in a considerably flatter peak. The separation factor is approximately 3.

What we claim is:

1. A chromatographic apparatus adapted to contain a retarding phase and a forwarding phase, the one flowing relative to the other and further comprising the feature of:
   (a) a conductive retarding phase;
   (b) electrical connections for applying an electrical potential difference between a locality on the retarding phase and a reference locality in said apparatus; and
   (c) a pulse generator for applying an alternating potential difference between the two localities.

2. The apparatus according to claim 1 in which the retarding phase is adjoined by a reference electrode substantially along its entire length in the direction of flow of the forwarding phase prescribed by the apparatus.

3. The apparatus according to claim 1 comprising a pair of terminals at opposite ends of the retarding phase for applying a potential gradient in the direction of flow between the retarding phase and forwarding phase prescribed by the apparatus.

4. The apparatus according to claim 3 in which the retarding phase is present as a conductive compressible packing and which comprises means for adjusting the resistance of the packing in the form of a means for varying the degree of compaction of the packing.

5. The apparatus according to claim 1 in which the retarding phase is provided by a packing of open pore foam texture of which at least the surface in contact with the forwarding phase is substantially conductive.

6. The apparatus according to claim 1 in which the conductive retarding phase is provided by a packing having a pore size in the range between 10 and 0.01 micron contained in a capillary between 0.5 and 3 mm. internal diameter, the inlet end being connected to a container for an eluent separated from the said inlet end by a porous partition pervious to the eluent but impervious to mercury, and comprising a nipple for connecting the container to a compressed gas container and a mercury plug between the nipple and the porous partition.

References Cited

UNITED STATES PATENTS

| | | | |
|---|---|---|---|
| 3,029,196 | 4/1962 | Matz et al. | 204—180 |
| 3,129,159 | 4/1964 | Raymond et al. | 204—180 |
| 3,326,790 | 6/1967 | Bergrahm | 204—180 |
| 3,346,479 | 10/1967 | Natelson | 204—301 |

JOHN H. MACK, Primary Examiner

A. C. PRESCOTT, Assistant Examiner

U.S. Cl. X.R.

204—180

UNITED STATES PATENT OFFICE
CERTIFICATE OF CORRECTION

Patent No. 3,539,494            Dated November 10, 1970

Inventor(s) VICTOR PRETORIUS and HANS HELMUT HAHN

It is certified that error appears in the above-identified patent and that said Letters Patent are hereby corrected as shown below:

Column 1, Line 71, change "include" to

---induce---

Signed and sealed this 27th day of April 1971.

(SEAL)
Attest:

EDWARD M. FLETCHER, JR.          WILLIAM E. SCHUYLER, JR.
Attesting Officer                 Commissioner of Patents